United States Patent
Nishitani et al.

[19]

[11] Patent Number: 6,151,980
[45] Date of Patent: Nov. 28, 2000

[54] STEERING MODULE

[75] Inventors: Keizo Nishitani; Toshifumi Okahira; Tomohiko Matsushita, all of Shizuoka, Japan

[73] Assignee: Yazaki Corporation, Tokyo, Japan

[21] Appl. No.: 09/197,603

[22] Filed: Nov. 23, 1998

[30] Foreign Application Priority Data

Nov. 21, 1997 [JP] Japan ................................. 9-321407

[51] Int. Cl.⁷ .............................. B62D 1/16; H01R 33/00
[52] U.S. Cl. ............................. 74/484 R; 74/498; 439/34
[58] Field of Search ................................. 74/484 R, 498; 439/34

[56] References Cited

U.S. PATENT DOCUMENTS

| | | | |
|---|---|---|---|
| 3,543,874 | 12/1970 | Nevett | 74/498 X |
| 4,429,588 | 2/1984 | Emundts et al. | 74/484 R |
| 4,635,029 | 1/1987 | Yamada | 340/22 |
| 4,638,287 | 1/1987 | Umebayashi et al. | 340/22 |
| 4,771,650 | 9/1988 | Kerner | 74/498 |
| 5,072,628 | 12/1991 | Oki | 74/484 R |
| 5,152,358 | 10/1992 | Kozuka | 74/498 X |

FOREIGN PATENT DOCUMENTS 60-69752  5/1985  Japan .

*Primary Examiner*—Allan D. Herrmann
*Attorney, Agent, or Firm*—Sughrue, Mion, Zinn Macpeak & Seas, PLLC

[57] ABSTRACT

A steering module comprises: a steering wheel attached to a member which is attached to a car body portion, the steering wheel being connected to a steering shaft which passes through the member; a pad having at least one electric part, the pad being attached to the member through the steering wheel. A first connector is arranged in the member. A second connector is arranged in the pad. The second connector electrically connects with the electrical part, and is electrically connected to the first connector. A car-body-side securing portion is arranged in the member. A pad-side securing portion is disposed on the pad. The car-body-side securing portion and the pad-side securing portion are engaged with each other so as to secure the member and the pad and connect the first connector with the second connector.

6 Claims, 4 Drawing Sheets

STEERING MODULE

BACKGROUND OF THE INVENTION

1. Field of the Invention

The present invention relates to a steering module including a non-rotative pad attached to a central portion of a steering wheel.

The present application is based on Japanese Patent Application No. Hei. 9-321407, which is incorporated herein by reference.

2. Description of the Related Art

In recent years, a variety of switches for controlling a driving operation and operating audio units have intensively been mounted on a pad disposed in the central portion of a steering wheel in addition to the conventional horn switch.

An example of a steering wheel apparatus of the foregoing type will now be described with reference to FIG. 5. FIG. 5 is an exploded perspective view showing a steering wheel apparatus. A combination switch 5 is joined to a steering column 3 disposed in a front panel 1. A steering shaft 7 is inserted into the steering column 3 and the combination switch 5. A connector 9, which is connected to a wire harness arranged in the car body portion, is disposed on a surface (a front surface) of the combination switch 5 facing a cabin.

A steering wheel 11 is screwed to a steering shaft 7 with a nut 17 such that the steering shaft 7 is inserted into a hole 15 formed in the central portion of a steering bracket 13. The steering bracket 13 is provided with a circuit board 19 having an operation switch circuit and so forth. The circuit board 19 has a car-body-side connector 21 on the front surface thereof. The car-body-side connector 21 is connected to a connector 9 disposed on the front surface of the combination switch through a rotary connection circuit member (a clock spring) (not shown) disposed on the rear surface of the steering bracket 13 when the steering wheel 11 has been secured to the steering shaft 7.

The steering bracket 13 is provided with a pair of pad bass 23a and 23b. A pad 25 is joined to the pad bases 23a and 23b. The pad 25 accommodates an air bag and so forth. A pad-side connector 27 electrically connected to a squib of the air bag or the like is disposed on the rear surface of the pad 25.

Therefore, when the pad 25 is joined to the pad bases 23a and 23b, the car-body-side connector 21 and the pad-side connector 27 are connected to each other. Thus, electronic components, including the air bag, arranged in the pad 25 is connected to the wire harness 33 arranged in the car body portion.

The foregoing steering wheel apparatus has the structure that the circuit board having the car-body-side connector mounted thereon is secured to the steering bracket. Then, the pad bases are secured to the steering bracket, and then the pad is joined to the pad bases. Thus, the car-body-side connector and the pad-side connector are connected to each other. Therefore, errors occur in an assembling operation between the circuit board and the steering bracket, between the steering bracket and the pad bases and between the pad bases and the pad. Thus, there is apprehension that the positions of the car-body-side connector and the pad-side connector are deviated from each other.

Therefore, the above steering wheel apparatus must employ, for example, a movable connector to serve as the pad-side connector. The movable connector is moved so that the deviation of the positions is absorbed. Therefore, there arises problems in that the workability is unsatisfactory and that employment of the movable connector raises the cost of the part.

SUMMARY OF THE INVENTION

In view of the foregoing, an object of the present invention is to provide a steering module which is capable of connecting a pad to a car-body-side connector without a movable connector.

To achieve the foregoing object, according to the present invention, there is provided a steering module which comprises: a steering wheel attached to a member which is attached to a car body portion, the steering wheel being connected to a steering shaft which passes through the member; a pad having at least one electric part, the pad being attached to the member through the steering wheel; a first connector arranged in the member; a second connector arranged in the pad, the second connector electrically connecting with the electrical part, and electrically connected to the first connector; a car-body-side securing portion arranged in the member; and a pad-side securing portion disposed on the pad; wherein the car-body-side securing portion and the pad-side securing portion are engaged with each other so as to secure the member and the pad and connect the first connector with the second connector. In this steering module, the car-body-side connector (first connector) and the pad-side connector (second connector) are respectively arranged in the car-body-side securing portion and the pad-side securing portion such that a predetermined positional relationship is maintained. Accordingly, when the pad-side securing portion is inserted into the car-body-side securing portion, the car-body-side connector and the pad-side connector are positioned such that the connection between the connectors is permitted. As a result, simultaneously with a moment at which the pad is secured to the member attached to the car body portion, the car-body-side connector and the pad-side connector are joined to each other.

Incidentally, the steering module may further comprises: an external gear secured to the steering shaft; an internal gear connected to the steering wheel, the internal gear being arranged to surround the external gear; and an intermediate gear rotatably supported by the member attached to the car body portion, the intermediate gear being located between and engaged with the external gear and the internal gear; wherein the car-body-side securing portion and the pad-side securing portion are located at an inside of the internal gear. Further, it is preferable that the first connector electrically connects with a wire harness arranged in the car body portion. Furthermore, it is preferable that the electric part includes one of a display unit and an operation switch mounted in the pad. Furthermore, it is preferable that the car-body-side securing portion has a first opening, the pad-side securing portion has a second opening, and wherein the first connector is accommodated in the first opening, and the second connector is accommodated in the second opening.

DETAILED DESCRIPTION OF THE PREFERRED EMBODIMENT

An embodiment of a steering module according to the present invention will now be described with reference to FIGS. 1–4.

Figure 2:
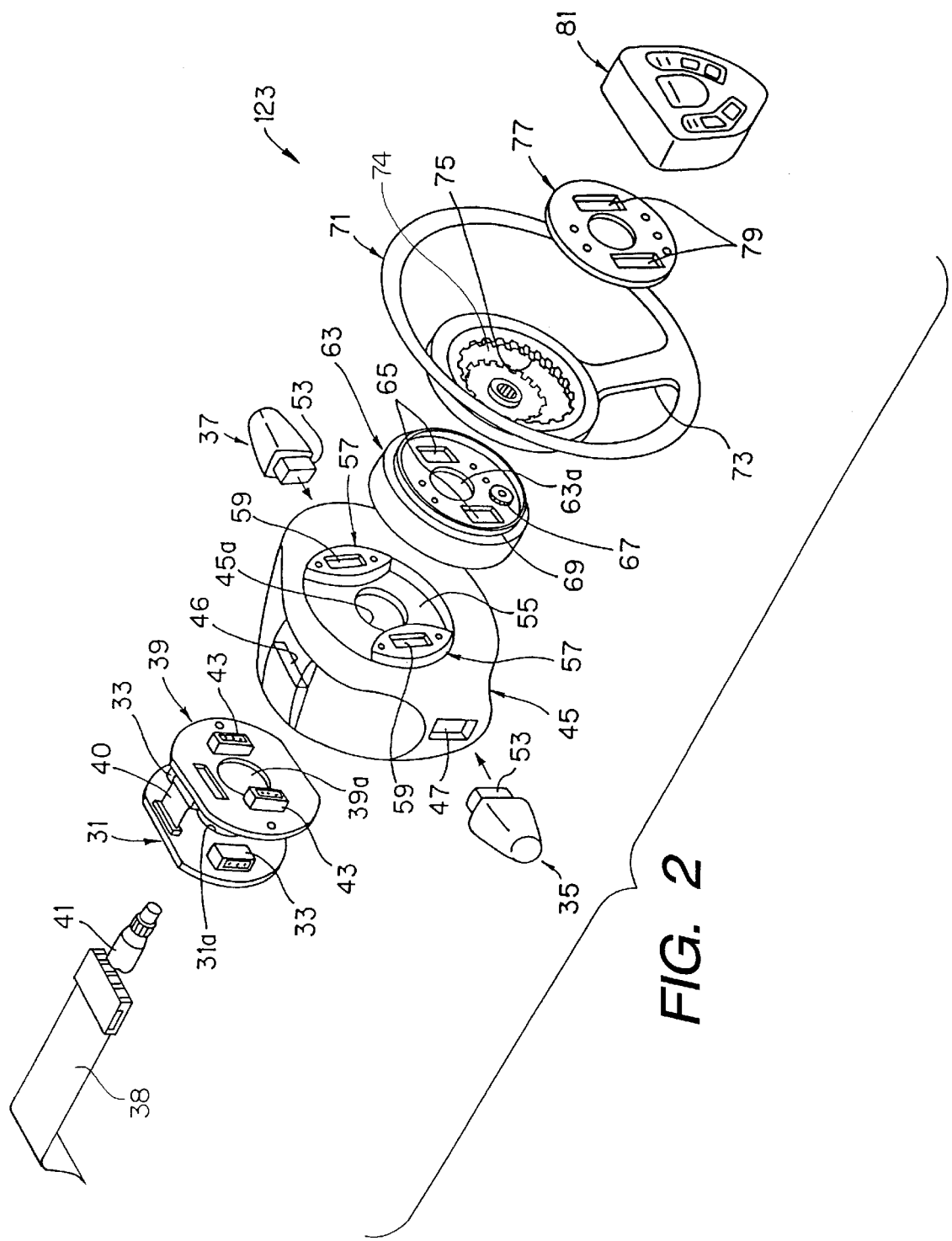
FIG. 2 is an exploded perspective view showing the steering module according to the present invention.
Figure 3:
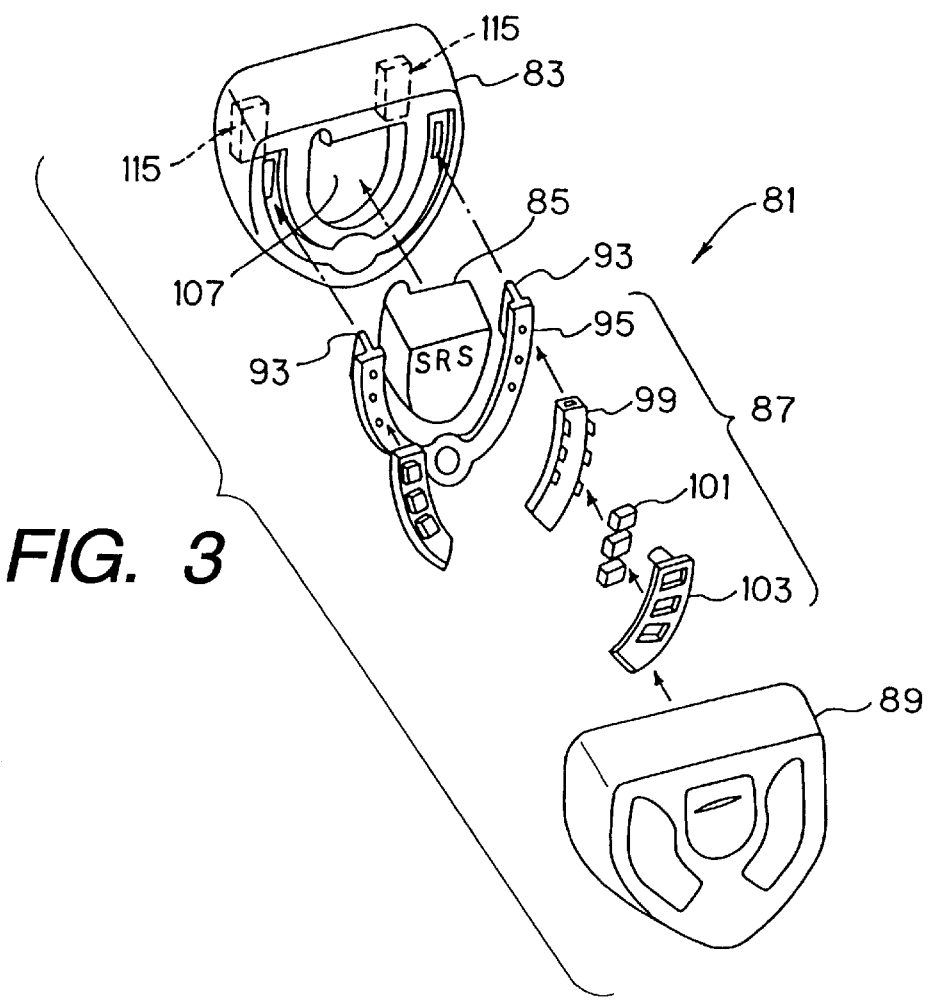
FIG. 3 is an exploded perspective view showing the pad shown in FIG. 2.

As shown in FIG. 2, a main substrate 31, to which a car-body-side wire harness is electrically connected, is secured to, for example, a column bracket (not shown) which is a member attached to a car body portion. A vehicle signal circuit, an LCD circuit and so forth are formed on the main substrate 31. A pair of substrate-side lever switch connectors 33, which are connected to the vehicle signal circuit, are mounted on the main substrate 31. The substrate-side lever switch connectors 33 are arranged to be engaged with corresponding lever switch units 35 and 37 (described later).

A relay substrate 39 is disposed apart from the car-body-side surface (hereinafter called a "front surface") of the main substrate 31 to be in parallel with the main substrate 31. The main substrate 31 and the relay substrate 39 are electrically connected to each other through a substrate-connecting cable (FFC) 40.

The main substrate 31 and the relay substrate 39 have, in the central portions thereof, shaft through holes 31a and 39a through which a steering shaft 41 is inserted. A plurality of car-body-side connectors 43, such as a pad connecting connector and an air-bag connecting connector, are mounted on the front surface of the relay substrate 39. The car-body-side connectors 43 are disposed in such a manner that the surfaces with which the engagement with the mating connectors is established face forwards.

A column cover 45, which is the member attached to the car body portion, is secured to a column bracket (not shown). The column cover 45 accommodates the main substrate 31 and the relay substrate 39. The column cover 45 has a through hole 45a which is penetrated by the steering shaft 41.

An LCD unit 46 is disposed on the column cover 45. The LCD unit 46 permits display of a state of operations of switches of a pad (described later). As a result, the states of the operations of the various switches can easily be recognized.

Lever-switch receiving holes 47 are formed on the two side surface of the column cover 45. When the column cover 45 has been secured to a predetermined position, the lever-switch receiving holes 47 coincide with the substrate-side lever switch connectors 33. The lever switch units 35 and 37 are inserted into the lever-switch receiving holes 47, respectively.

The lever switch units 35 and 37 have base portions provided with unit-side connectors 53. When the unit-side connectors 53 are engaged with the substrate-side lever switch connectors 33, the lever switch units 35 and 37 are electrically connected and joined to the main substrate 31.

As an alternative to supporting and securing the lever switch units 35 and 37 by dint of the engagement and locking between the substrate-side lever switch connectors 33 and the unit-side connectors 53, engaging means may be provided which are engaged with those of the column cover 45 so that the lever switch units 35 and 37 are supported and secured by the column cover 45.

A circular recess 55 is formed in the front surface of the column cover 45 such that the recess 55 is concentric with a through hole 45a. Right and left car-body-side securing portions (connection knock portions) 57 for securing a pad (described later) project over the surface of the recess 55 such that the through hole 45a is interposed.

Figure 1:
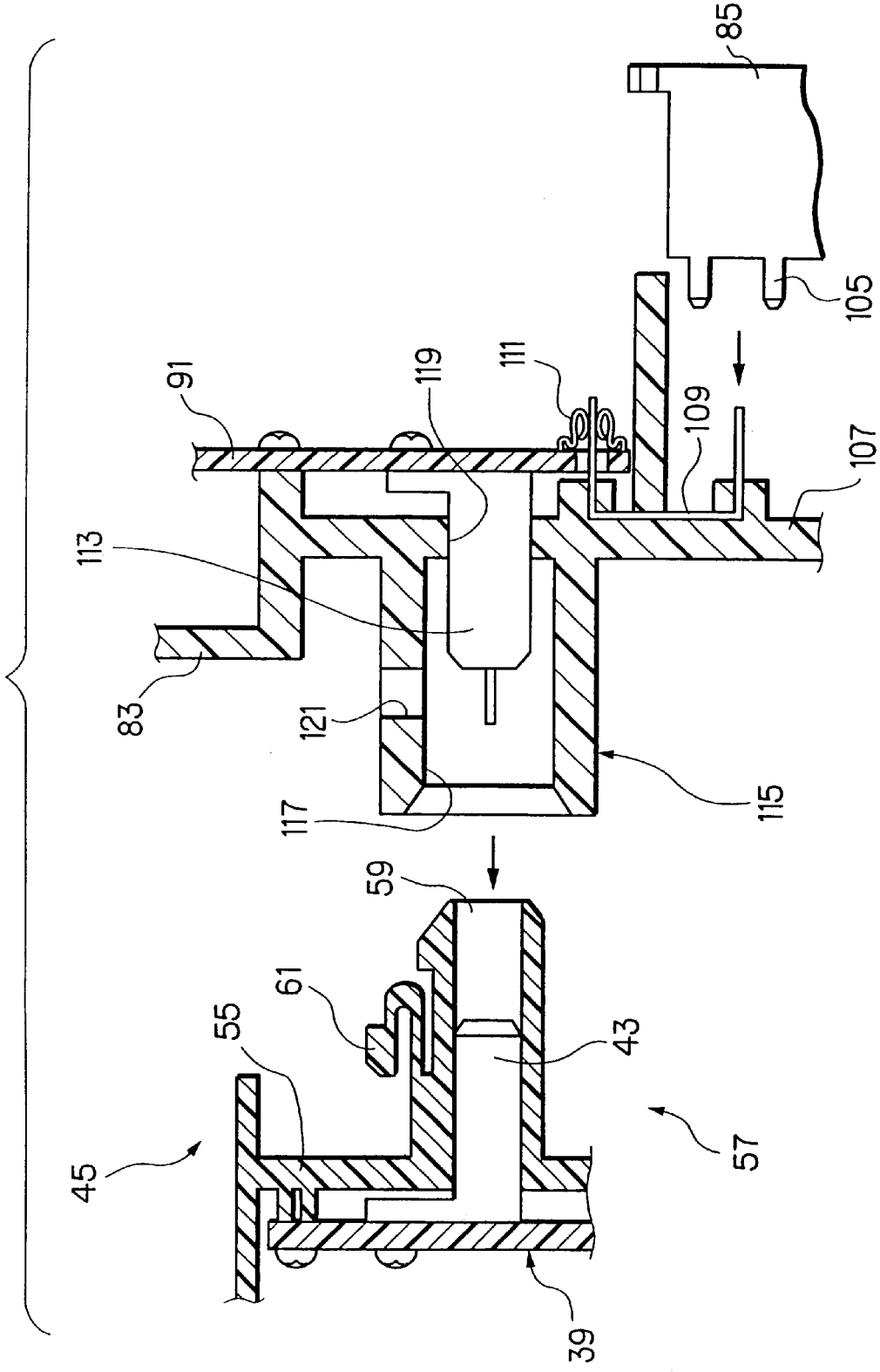
FIG. 1 is an enlarged cross sectional view showing an essential portion of a steering module according to the present invention.

As shown in FIG. 1, the connection knock portions 57 is formed into a cylindrical shape projecting over the front surface of the recess 55. The foregoing car-body-side connectors 43 are inserted into a central opening 59 so that the car-body-side connectors 43 are exposed from the front surface of the column cover 45. When the car-body-side connectors 43 are inserted into the openings 59, the car-body-side connectors 43 are disposed at predetermined positions with respect to the connection knock portions 57. Elastic engaging members (locks) 61, which are engaging means, are disposed on the outer surface of the connection knock portions 57. The locks 61 are engaged with pad-side securing portions (described later).

A gear box 63 formed into a flat cylindrical shape is fitted into the recess 55. A shaft hole 63a for exposing an end of the steering shaft 41 is formed in the central portion of the gear box 63. Right and left relay holes 65 are formed in the front surface of the gear box 63 such that the shaft hole 63a is interposed. The relay holes 65 accommodate the connection knock portions 57.

An intermediate gear 67 is disposed in the front surface of the gear box 63. The intermediate gear 67 is engaged with an external gear 74 secured to the steering shaft 41 through a box-inside intermediate gear and a relay gear 74 in the gear box 63 so as to be rotated synchronously.

A peripheral wall 69 is formed on the front surface of the gear box 63. The peripheral wall 69 accommodates an annular internal gear 75 connected to the steering wheel 71 through a spoke 73. The internal gear 75 accommodated in the peripheral wall 69 is engaged with the foregoing intermediate gear 67 disposed in the front surface of the gear box 63. The internal gear 75 is rotatably held and secured by a gear cover 77 which is secured to the front surface of the gear box 63 with screws (not shown).

Therefore, when the steering wheel 71 has been rotated, the internal gear 75 accommodated in the peripheral wall 69 rotates the intermediate gear 67 in the same direction. Thus, the steering shaft 41 is rotated through the box-inside intermediate gear, the relay gear and the external gear. At this time, the gear box 63 and the gear cover 77 secured to the column cover 45 are made to be non-rotative and brought to stationary states regardless of the rotations of the steering wheel 71.

Relay holes 79 for permitting appearance of the connection knock portions 57 accommodated in the foregoing relay holes 65 are formed in the front surface of the gear cover 77. Therefore, the car-body-side connectors 43 are exposed through the relay holes 79 of the gear cover 77.

A pad 81 provided with a display unit, operation switches or an air bag is joined to the front surface of the gear cover 77. The pad 81 is composed of a pad body 83, an air bag 85, a switch unit 87 and a pad sheet 89 shown in FIG. 3 and a pad substrate 91 shown in FIG. 1.

Figure 4:
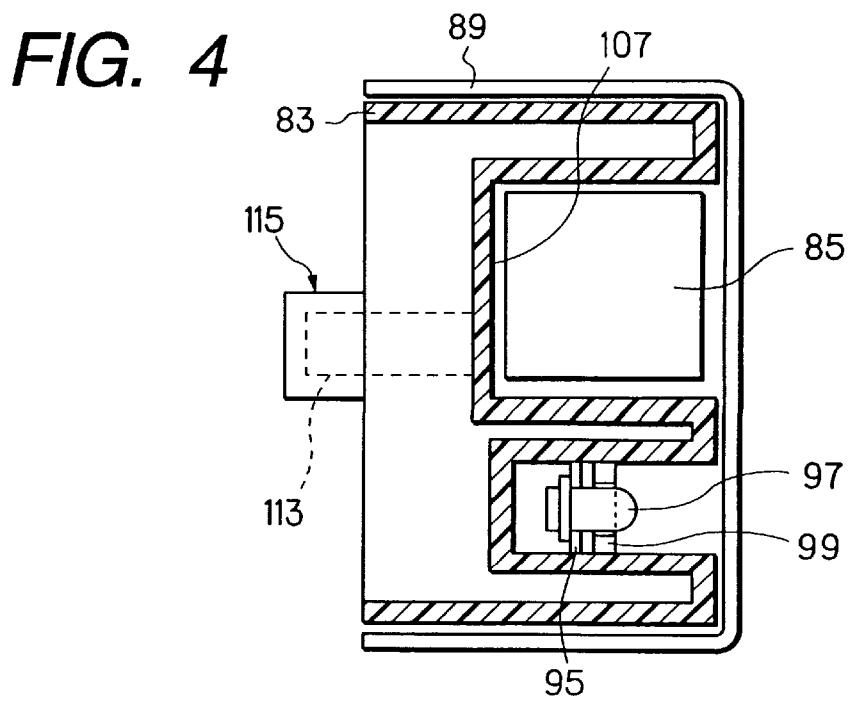
FIG. 4 is a cross sectional view showing the pad shown in FIG. 2.
Figure 5:
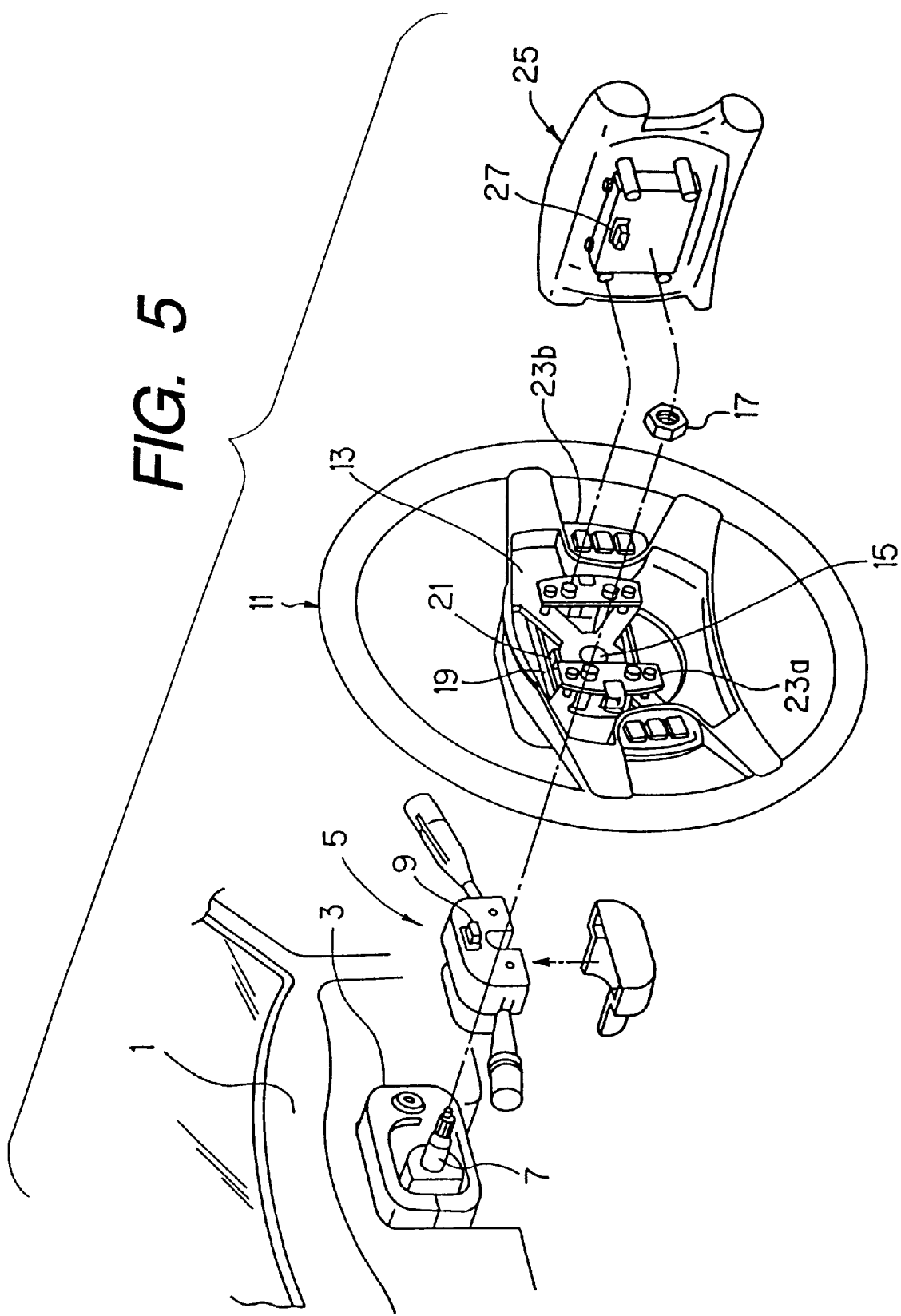
FIG. 5 is an exploded perspective view showing a steering wheel apparatus.

A switch unit 87 is composed of a switch substrate (a HPC) having a connector 93, a light transmissive plate 99 for transmitting a light beam from a light source 97 shown in FIG. 4, a key top 101 and a holding frame 103. The switch unit 87 is assembled such that the switch substrate 95 is connected to the pad substrate 91 through the connector 93. Then, the light transmissive plate 99 and the key top 101 are disposed on the upper surface of the switch substrate 95. Then, the holding frame 103 is joined, and then the overall body of the pad body 83 is covered with the pad sheet 89.

On the other hand, an air-bag connector 105 (see FIG. 1) connected to a squeeze is disposed on the rear surface of the air bag 85. An accommodating portion 107 on which the air bag 85 is mounted is formed in the central portion of the pad body 83. As shown in FIG. 1, a bus bar 109 having a leading end which is electrically connected to a terminal of the air-bag connector 105 is integrally formed with the accommodating portion 107 of the pad body 83. Another end of the bus bar 109 is connected to an air bag circuit of the pad substrate 91 through a connecting terminal 111.

When the air bag 85 is mounted on the accommodating portion 107, the air-bag connector 105 is brought into contact with the bus bar 109 so as to be connected to the air bag circuit of the pad substrate 91 through the bus bar 109.

A plurality (two in this embodiment) of pad-side connectors 113 for electrically connecting electric circuits of the display unit, the operation switches or the air bag are secured to the rear surface of the pad substrate 91.

Knock receiving cylinders 115 which are the pad-side securing portions project over the rear surface of the pad body 83. The knock receiving cylinders 115 are formed into cylindrical shapes projecting over the rear surface of the pad body 83 Pad-side connectors 113 are disposed in the central accommodating space 117. When the pad-side connectors 113 are inserted into through holes 119 formed in the pad body 83, the pad-side connectors 113 are disposed in the accommodating space 117 such that a predetermined positional relationship with the knock receiving cylinders 115 is maintained.

The connection knock portions 57 are received in the accommodating space 117 of the knock receiving cylinders 115. An engaging hole 121 is formed in the side wall of the knock receiving cylinders 115. The locks 61 disposed on the outer surface of the connection knock portions 57 are engaged with the engaging holes 121. The locks 61 engaged with the engaging holes 121 can be separated when the locks 61 are pressed from outside of the engaging holes 121.

That is, when the knock receiving cylinders 115 is inserted into the outside portion of the connection knock portions 57 from the front surface of the air bag 85, the locks 61 of the connection knock portions 57 are engaged with the engaging holes 121. Thus, the pad 81 is secured to the column cover 45 through the connection knock portions 57. Simultaneously, the pad-side connectors 113 in the knock receiving cylinders 115 are joined to the car-body-side connectors 43 in the connection knock portions 57.

When the steering module 123 having the above-mentioned components is assembled, the steering shaft 41 is inserted so that the main substrate 31 is secured to the column bracket (not shown). Then, the steering shaft 41 is inserted into the front surface of the main substrate 31 so that the relay substrate 39 is secured.

Then, the steering shaft 41 is inserted so that the column cover 45 is secured to the column bracket (not shown). In the foregoing state, the lever switch units 35 and 37 can be mounted. The lever switch units 35 and 37 are mounted such that the base portions of the lever switch units 35 and 37 are inserted into the lever-switch joining holes 47 so that the unit-side connectors 53 are engaged with the substrate-side lever switch connectors 33 of the main substrate 31.

Then, the gear box 63 is secured to the inside portion of the recess 55 from the front surface of the column cover 45.

The internal gear 75 connected to the steering wheel 71 is inserted into the peripheral wall 69 of the gear box 63. Then, the gear cover 77 is secured to the front surface of the gear box 63 such that the internal gear 75 is interposed.

As a result, the steering wheel 71 is rotatably secured to the gear box 63 through the internal gear 75. Moreover, the connection knock portions 57 and the car-body-side connectors 43 are exposed from the front surface of the gear cover 77.

Finally, the knock receiving cylinders 115 of the pad 81 are inserted into the connection knock portions 57. The locks 61 of the connection knock portions 57 are engaged with the engaging holes 121. Then, the pad 81 is secured to the column cover 45 through the connection knock portions 57. Simultaneously with this, the pad-side connectors 113 in the knock receiving cylinders 115 are joined to the car-body-side connectors 43 in the connection knock portions 57. Thus, the process for assembling the steering module 123 is completed.

Therefore, the steering module 123 can be assembled by sequentially disposing, from the front surface, the main substrate 31, which is the lowermost member, the relay substrate 39, the column cover 45, the gear box 63, the steering wheel 71, the gear cover 77 and the pad 81. Thus, a so-called stacking method can be employed to dispose the foregoing components in the above-mentioned sequential order.

As described above, the steering module 123 has the structure that the connection knock portions 57 disposed in the internal gear 75 are disposed on the column cover 45. The car-body-side connectors 43 are disposed in the connection knock portions 57. On the other hand, the knock receiving cylinders 115, which are engaged with the connection knock portions 57 through the engaging means, are arranged in the pad 81. Moreover, the pad-side connectors 113 are disposed in the knock receiving cylinders 115. Therefore, simultaneously with the process for engaging the knock receiving cylinders 115 to the connection knock portions 57 to secure the pad 81 to the column cover 45, the car-body-side connectors 43 and the pad-side connectors 113 can be joined to one another.

The car-body-side connectors 43 and the pad-side connectors 113 are disposed in the corresponding connection knock portions 57 and the knock receiving cylinders 115 such that a predetermined positional relationship is maintained. Therefore, when the connection knock portions 57 and the knock receiving cylinders 115 are engaged with one another, the car-body-side connectors 43 and the pad-side connectors 113 can be brought to the positions at which the joint is permitted.

As described above, the steering module according to the present invention has the structure that the car-body-side securing portion and the pad-side securing portion arranged to be engaged with each other are disposed in the member attached to the car body portion and the pad. Moreover, the car-body-side connector and the pad-side connector are disposed in the car-body-side securing portion and the pad-side securing portion, respectively. Therefore, simultaneously with the process for engaging the pad-side securing portion to the car-body-side securing portion to secure the pad to the member attached to the car body portion, the car-body-side connector and the pad-side connector can be connected to each other. As a result, the necessity of employing a movable connector for absorbing the positional deviation between the two connectors can be eliminated. Thus, the workability can be improved and the part cost can be reduced.

What is claimed is:

1. A steering module, comprising:
   a steering wheel attached to a member which is attached to a car body portion, the steering wheel being connected to a steering shaft which passes through the member;

a pad having at least one electric part, the pad being attached to the member through the steering wheel;

a first connector arranged in the member;

a second connector arranged in the pad, the second connector electrically connecting with the electrical part, and electrically connected to the first connector;

a car-body-side securing portion arranged in the member; and a pad-side securing portion disposed on the pad;

wherein the car-body-side securing portion and the pad-side securing portion are engaged with each other so as to secure the member and the pad and connect the first connector with the second connector.

2. The steering module of claim 1, wherein when the pad is attached to the member attached to the car body portion, the second connector is electrically connected to the first connector.

3. The steering module of claim 1, further comprising:

an external gear secured to the steering shaft;

an internal gear connected to the steering wheel, the internal gear being arranged to surround the external gear; and an intermediate gear rotatably supported by the member attached to the car body portion, the intermediate gear being located between and engaged with the external gear and the internal gear;

wherein the car-body-side securing portion and the pad-side securing portion are located at an inside of the internal gear.

4. The steering module of claim 1, wherein the first connector electrically connects with a wire harness arranged in the car body portion.

5. The steering module of claim 1, wherein the electric part includes one of a display unit and an operation switch mounted in the pad.

6. The steering module of claim 1, wherein the car-body-side securing portion has a first opening, the pad-side securing portion has a second opening, and wherein the first connector is accommodated in the first opening, and the second connector is accommodated in the second opening.

* * * * *